United States Patent Office 3,068,518
Patented Dec. 18, 1962

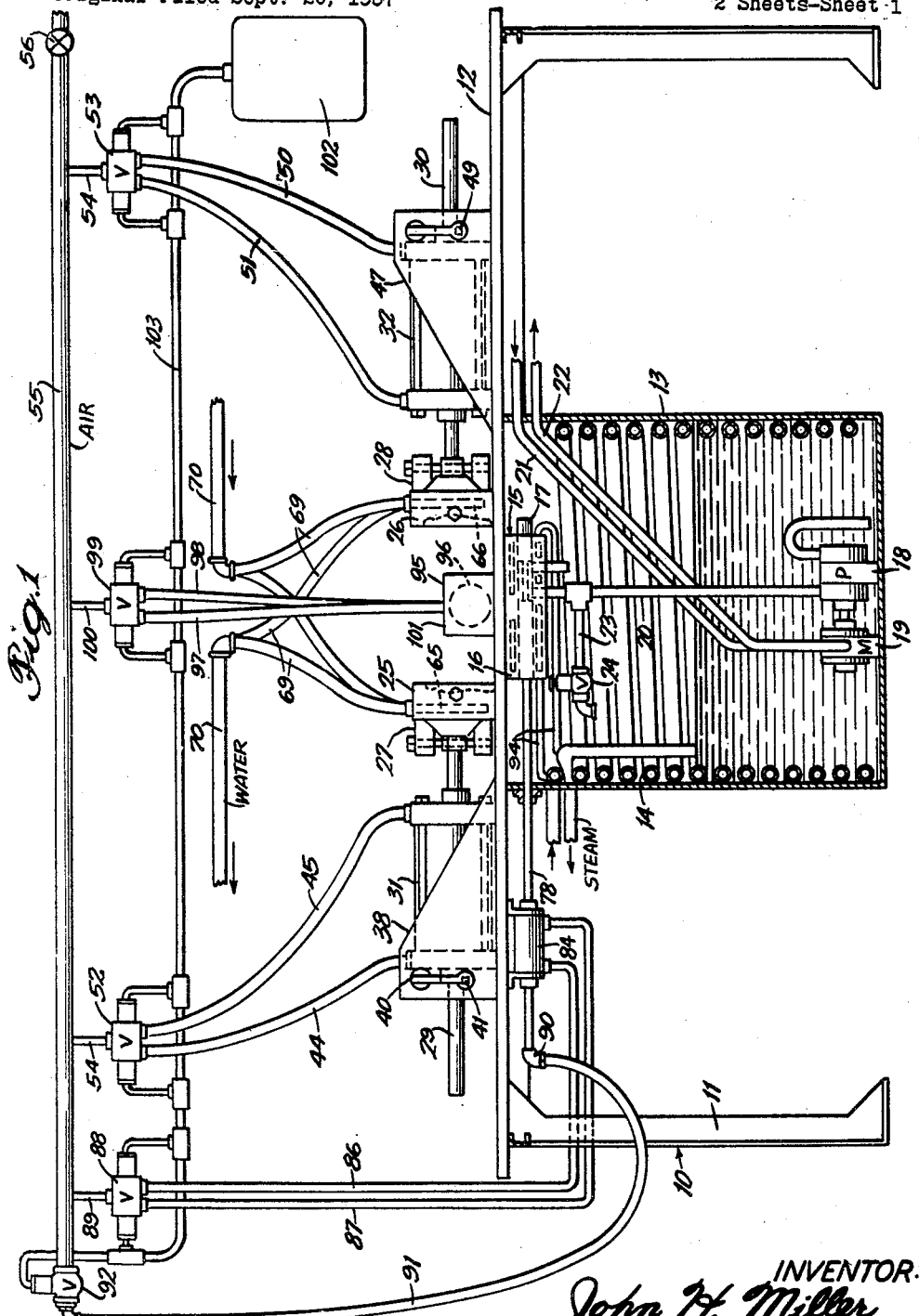

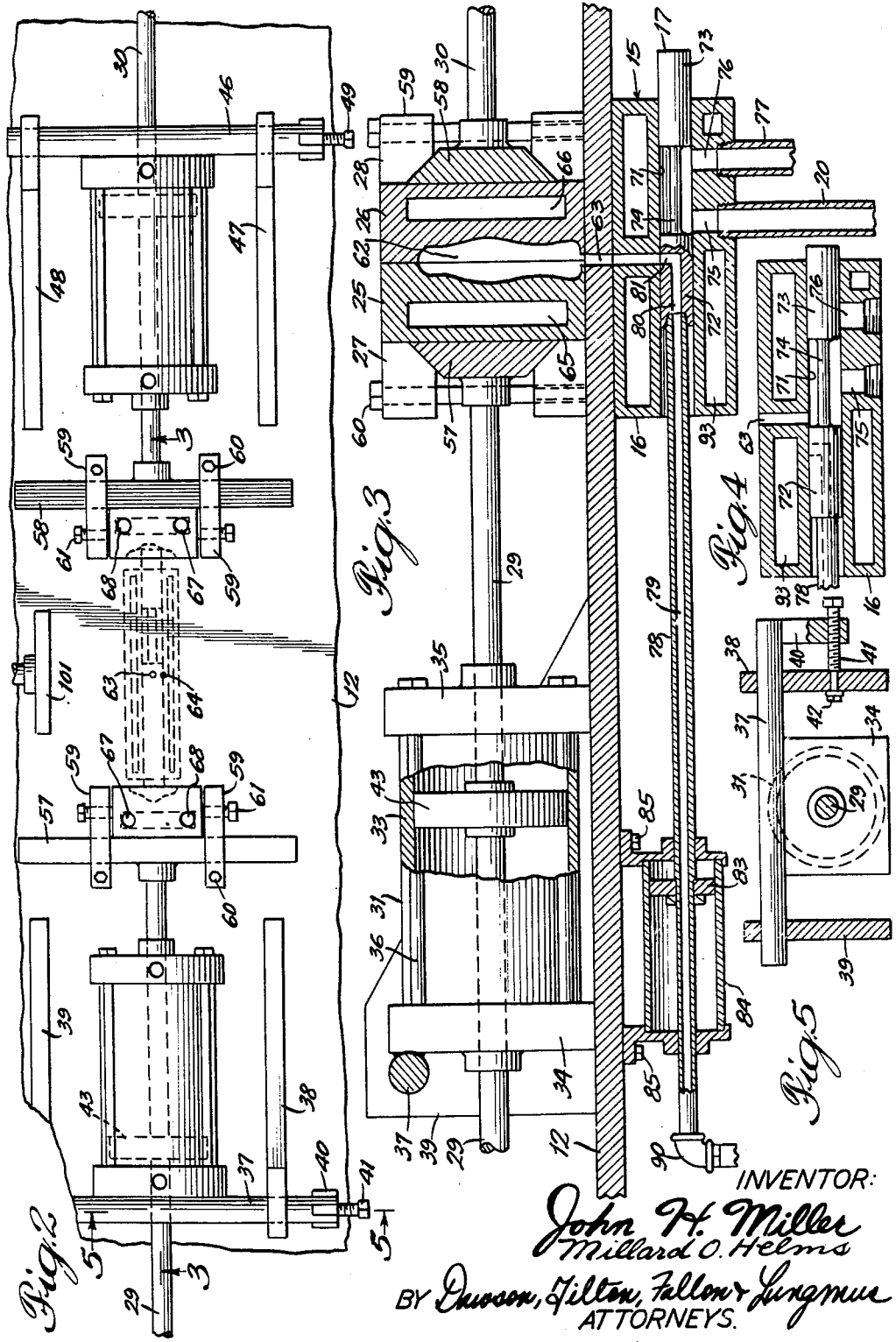

3,068,518
APPARATUS FOR MOLDING HOLLOW
PLASTIC PRODUCTS
John H. Miller, Hollywood, and Millard O. Helms,
Sepulveda, Calif., assignors, by mesne assignments, to
Mold-A-Rama, Inc., Los Angeles, Calif., a corporation
of California
Original application Sept. 20, 1957, Ser. No. 685,261.
Divided and this application Feb. 29, 1960, Ser. No.
11,605
8 Claims. (Cl. 18—26)

This invention relates to an apparatus for quickly and accurately molding a quantity of hollow plastic products such as plastic figures, toys and the like.

The present application is a division of my copending application, Serial No. 685,261, filed September 20, 1957, and now abandoned.

One of the principal objects of the present invention is to provide a machine capable of producing hollow plastic products in rapid succession. Another object is to provide a machine having a plurality of complementary mold sections which sequentially engage and disengage each other, a hollow plastic product being automatically formed during the cycle of operation when the mold sections are in mutual engagement. In this connection, it is a specific object to provide an apparatus wherein a molten plastic material is forced, under pressure, through the mold cavity and is then followed by a blast of compressed gas which forces the core of molten plastic from the cavity leaving a wall of solidified plastic against the mold surfaces. A still further object is to provide an apparatus which may be easily adapted for molding large quantities of plastic products of different size and shape.

Other objects will appear from the specification and drawings in which:

FIGURE 1 is a broken front elevation of an apparatus embodying the present invention; FIGURE 2 is a broken top plan view showing structural details of the apparatus; FIGURE 3 is an enlarged front elevation of the apparatus shown partly in section and taken along line 3—3 of FIGURE 2; FIGURE 4 is a vertical sectional view of the valve assembly similar to the valve assembly shown in FIGURE 3 but illustrating the valve member in a different position; and FIGURE 5 is a vertical sectional view taken along line 5—5 of FIGURE 2.

Referring to the embodiment of the invention illustrated in FIGURE 1 of the drawings, the numeral 10 generally designates a frame having support legs 11 and a generally horizontal platform 12. Beneath the platform is a tank 13 which serves as a reservoir for a molten plastic material such as liquid polyethylene. The interior of the tank is lined with a spiral steam conduit 14 for maintaining the plastic material in a molten state. The steam jacket or conduit may be connected to any suitable source of steam (not shown).

Beneath platform 12 and within the confines of tank 13 there is a valve assembly generally designated by the numeral 15. This assembly essentially comprises a valve casing 16 and a movable valve member 17. It will be noted that the valve assembly is supported from the platform well above the level of molten plastic material within tank 13. A pump 18 powered by motor 19 drives molten plastic material from the reservoir to the valve assembly through conduit 20. Both the pump and the motor may be immersed within the mass of molten plastic and as shown in FIGURE 1 the motor may be operated by compressed air or other fluid carried by pipes 21 and 22. If desired, a bleed conduit 23, equipped with an adjustable valve 24 may be interposed between the pump and the valve assembly and along conduit 20 for regulating the flow of plastic material to assembly 15.

In the illustration given a pair of mold sections 25 and 26 are movably supported upon the upper surface of platform 12 above tank 13. Clamping assemblies 27 and 28 connect the respective mold sections to horizontal piston shafts 29 and 30. These shafts extend through cylinders 31 and 32 respectively.

As shown in FIGURE 3, cylinder 31 has a cylindrical side wall 33 and a pair of end plates 34 and 35 secured thereto by means of bolts 36. The outer end plate 34 is welded or otherwise secured to a horizontal shaft 37 which extends in a direction transverse to the axis of the piston shaft 29. Opposite end portions of the transverse shaft extend through vertical mounting plates or members 38 and 39 disposed on opposite sides of the cylinder. The parallel plates 38 and 39 may be welded upon platform 12 or may be rigidly secured thereto in any other suitable manner.

Since the transverse shaft is slidably received by plates 38 and 39, lateral adjustment of the piston cylinder and shaft may be accomplished by shifting the position of shaft 37 with reference to the mounting plates. As shown most clearly in FIGURE 5, shaft 37 is equipped with a depending arm 40 which has a threaded horizontal bore adapted to threadedly receive adjustment screw 41. One end of the adjustment screw projects through an opening in plate 38 and is freely rotatable therein. However, the enlarged end 42 of the screw restricts its longitudinal movement relative to the mounting plate. Therefore, upon rotation of the adjustment screw, the piston cylinder 31 and shaft 29 are shifted laterally between the vertical mounting plates.

In FIGURE 3 it will be seen that shaft 29 is equipped with a piston 43 which slidably engages the inner surface of cylinder wall 33. As compressed air or other fluid flows into the outer portion of the cylindrical chamber from conduit 44 (FIGURE 1), piston 43 is forced inwardly along with shaft 29 and mold section 25, and the mold section is moved into a first position directly above valve assembly 15 (FIGURE 3). On the other hand, when the compressed air is forced into the opposite end of the cylinder through conduit 45 the movable mold section is shifted to a second or retracted position (FIGURES 1 and 2).

Like piston cylinder 31, cylinder 32 is provided with a transverse shaft 46 slidably carried by mounting plates 47 and 48. Adjustment means 49 is identical in structure and operation to the depending arm 40 and threaded screw 41 which had been previously described. Since the structure and operation of the opposing piston assemblies are identical, a more detailed description of the structure of cylinder 32 is believed unnecessary herein. When compressed air passes through conduit 50 into the outer end portion of cylinder 32, a shaft 30 moves inwardly and carries mold section 26 into a first position above the valve assembly. Mold section 26 is returned to its original or second position when air is forced into the opposite end of the cylinder through hose 51. Hence, the two piston assemblies work in opposition, the two mold sections 25 and 26 having their opposing vertical surfaces in contact with each other when each of the sections is in its first position, and being spaced from each other, as shown in FIGURE 1, when each of the sections is in its second or retracted position.

Referring to FIGURE 1 the paired air supply conduits for each piston cylinder are connected to solenoid-operated valves 52 and 53 respectively. The solenoid valves are in turn connected by pipes 54 to a manifold 55 which extends from a suitable source of compressed air or other pressure fluid (not shown). If desired, manifold 55 may be provided with a shut-off valve 56.

In the illustration given the mold support structures 27 and 28 are adjustable to accommodate mold sections of various sizes. The two support structures are identical and are each provided with a horizontal bar 57, 58, respectively, which extends transversely with reference to the direction of movement of the mold sections. The mold sections are held in place against these bars by longitudinally extending clamping members 59 (FIGURE 2) which are adjustably secured to the bars by vertical bolts 60 and which are equipped with set screws 61 for engaging the mold sections and maintaining them in opposing relation.

As illustrated most clearly in FIGURE 3, the opposing surfaces of the mold sections have complementary recesses which together define a cavity 62, when the opposing surfaces are in contiguous relation. Cavity 62 is completely closed except for lower inlet and outlet openings provided by one or both of the mold sections which communicate with inflow and outflow passages 63 and 64 provided in platform 12 and valve casing 16. While I have shown only a pair of such passages in the drawings, it will be understood that a greater number may be provided depending upon the size and shape of the plastic product to be formed.

To maintain the mold sections at the reduced temperature required for proper solidification of a portion of the molten plastic material passing through cavity 62 during operation of the apparatus, I provide each of the sections 25 and 26 with flow passages 65 and 66. These passages or chambers are provided with inlet and outlet openings 67 and 68 respectively, and a coolant such as cold water is carried into and out of these chambers by flexible hoses 69 and conduits 70, as shown in FIGURE 1. In this manner, coolant is circulated through the mold sections and the sections are maintained at a suitable and uniform temperature.

Referring to FIGURES 3 and 4, it will be observed that the valve casing 16 has a cylindrical bore 71 extending therethrough and that the valve member 17 is slidable between two positions within that bore. Valve 17 is generally dumbbell shaped; that is, it has enlarged cylindrical end portions 72, 73 and an intermediate portion 74 of reduced diameter. A pair of openings 75 and 76 extend through the casing wall and communicate with bore 71 at different points along its longitudinal extent. It will be noted that the length of intermediate portion 74 is at least as great as the distance between spaced openings 75 and 76. The casing wall about opening 75 is threaded for threadedly receiving the upper end portion of conduit 20, the lower portion of that conduit being connected to pump 18 within tank 13. If desired, the casing wall about opening 76 may be similarly threaded to receive fitting 77.

One of the end portions of the valve member, end portion 72, is threadedly connected to a shaft 78 which is axially aligned with the valve member and with bore 71. Shaft 78 is provided with a longitudinal flow passage 79 extending therethrough and this flow passage is in direct communication with a flow passage provided by the enlarged portion or head 72. As shown most clearly in FIGURE 3, the flow passage of head 72 comprises an axial portion 80 which is aligned with the axial passage of shaft 78 and a transverse portion 81 which is aligned with the flow passage 63 extending upwardly through the valve casing and platform 12 when both of the openings 75 and 76 communicate with the annular space extending about the intermediate portion of the valve member. A piston 83 is fixed upon shaft 78 adjacent the opposite end thereof and this piston is disposed within a cylinder 84 which is rigidly secured by bolts 85 or by any other suitable means to the underside of platform 12. The piston is reciprocated within the cylinder by compressed air carried by conduits 86 and 87 extending from solenoid valve 88. The solenoid valve is in turn connected to manifold 55 by pipe 89 (FIGURE 1).

At its outermost end, the tubular shaft 78 is connected by fitting 90 to one end of a flexible tube or hose 91. The other end of that hose is connected to a solenoid-operated valve 92 attached to manifold 55. Hence, when valve 92 is in open position, compressed air may flow from the manifold through hose 92 and tubular shaft 78 to valve head 72. It will be noted, therefore, that shaft 78 not only functions as a piston shaft for reciprocating the slidable valve member 17 but also serves as a conduit for delivering compressed air to the vertical inflow passage 63 and to the cavity defined by the complementary mold sections.

To prevent solidification of plastic material within the valve casing, we have provided the casing with a steam chamber or compartment 93 for the circulation of steam through the casing and about bore 71. Pipes 94 extend from the steam chamber of the valve casing (FIGURE 1) and may be connected to the same conduits which carry steam to and from the heating coil lining the interior of tank 13.

Referring to FIGURES 1 and 2, it will be seen that means are provided for pushing plastic products formed by the mold sections off of the platform 12 where they may then be collected in any suitable receptacle (not shown). Such means comprises a piston assembly 95 which is disposed so that horizontal piston cylinder 96 is equidistant from the mold sections with its axis normal to the direction of movement of those sections. Like the piston structures already described, piston assembly 95 is operated by compressed air delivered through a pair of conduits 97 and 98. A solenoid-operated valve 99 is disposed between these conduits and a pipe 100 branching from manifold 55. Valve 99 thereby controls the flow of air through the conduits leading to opposite ends of the piston cylinder 96. The end of the piston shaft nearest the mold sections is equipped with an upstanding pusher plate or member 101 which is retracted out of the path of movement of the mold sections when compressed air flows to the front of the piston cylinder through conduit 97. However, when valve 99 directs the compressed air through conduit 98, the pusher member is driven forwardly between the spaced mold sections to sweep or push the plastic product formed by the molds off of platform 12 and into a suitable receptacle.

From the foregoing, it is believed apparent that the operation of the apparatus depends upon the flow of compressed air or other fluid to the several piston cylinders and that this air flow is in turn controlled by the sodenoid valves associated with the respective piston assemblies. A timer, diagrammatically illustrated in FIGURE 1 and designated by numeral 102, is electrically connected through branched conduit 103 to the solenoids of valves 52, 53, 88, 92 and 99 and controls the sequential operation of these electrically actuated valves. Since such timers are well known in the art, a detailed description of its construction and the electrical circuit involved in believed unnecessary for purposes of disclosing the present invention.

In the operation of the embodiment shown in the drawings and described above, pump 18 directs a continuous flow of molten plastic material upwardly through pipe 20 and into the valve casing. The amount of molten plastic flowing into the valve casing 16 through opening 75 may be varied by manually adjusting the by-pass valve 24. When the valve member 17 is in the position shown in FIGURES 1, 2 and 3, the liquid plastic flows into the portion of the bore disposed between the ended portions or heads 72 and 73 of the valve member and returns to the reservoir through opening 76. Steam circulating within the chamber or passage 93 of the valve casing maintains the casing at a sufficiently high temperature to prevent solidification of the plastic material.

At the commencement of each cycle of operation the movable parts of the apparatus are in the respective positions shown in FIGURE 1. Electrically operated valve 92 is closed, thereby preventing the flow of compressed air to valve assembly 15. Timer 102 first switches the solenoids of valves 52 and 53 so that compressed air passes into the outer or remote ends of cylinders 31 and 32 and drives the mold sections 25 and 26 into engagement directly above the valve assembly 15. After the opposing surfaces of the mold sections are in contiguous relation (FIGURE 3), valve 88 is electrically actuated to permit the flow of compressed air through conduit 87 and into piston cylinder 84. Valve 17 is thereby shifted into "first" position wherein end portion 73 seals off opening 76 and opening 75 is placed into direct communication with passage 63 extending upwardly through the valve casing and platform 12 (FIGURE 4). Since the flow of liquid plastic is no longer bypassed through opening 76 it passes upwardly through bore 71, passage 63 and into the mold cavity 62. As soon as the molten plastic has completely filled the mold cavity, valve 88 is again electrically actuated to reverse the flow of compressed air into cylinder 84 and to move the valve member or body into the second position shown in FIGURE 3. At the same time valve 92 is electrically opened, thereby permitting compressed air to flow through the tubular piston shaft 78 and through the aligned passages of the valve member and valve casing. The blast of air passing upwardly through passage 63 drives the molten core of plastic material within the mold cavity out through passage 64 and back into the tank 13, thereby leaving a layer of solidified plastic material against the relatively cool surfaces defining the mold cavity. Valve 92 then closes to interrupt the flow of air through the mold cavity and solenoid valves 52 and 53 are electrically actuated to reverse the flow of compressed air to piston cylinders 31 and 32. After the mold sections have been shifted into retracted positions the solenoid-controlled air-operated piston assembly 95 drives the pusher member 101 forwardly to sweep the hollow molded product off of the platform 12 and into a suitable receptacle. When the pusher member has again returned to its original position, the operating cycle is completed. The above described steps are then repeated to form any desired number of hollow plastic products quickly and automatically.

As already pointed out, the mold support structures 27 and 28 are adjustable to accommodate mold sections of various dimensions. Therefore, it is apparent that larger (or smaller) mold sections may be substituted for those shown in the drawing and that hollow plastic products of different sizes and shapes may be formed by the apparatus of the present invention. Cylinders 31 and 32 may be laterally repositioned by adjusting the screws 41 and 49 to insure proper alignment of passage 63 and the inlet opening of the mold cavity when the mold sections are in contiguous relation.

While in the foregoing we have disclosed the present invention in considerable detail for the purpose of illustrating an embodiment thereof, it will be understood that many of these details may be varied considerably without departing from the spirit and scope of the invention.

We claim:
1. In an apparatus for molding hollow products of a plastic capable of melting upon heating and of passing into a hardened state upon cooling, a pair of mold sections having opposing surfaces provided with complementary recesses together defining a cavity and having inlet and outlet openings communicating with said cavity, means for cyclically shifting each of said mold sections between a first position wherein said opposing surfaces are in contiguous relation and a second position wherein said surfaces are spaced apart, a valve casing having a passage communicating with said inlet opening when each of said mold sections is in said first position, a source of molten plastic material, a source of compressed air, passage means for conducting a continuous stream of molten plastic and a stream of compressed air from said sources to said valve casing, a valve member being movable between a first position wherein said source of molten plastic communicates with said casing passage and a second position wherein said source of compressed air communicates with said passage and said passage means returns said continuous stream of molten plastic to its source, and means for moving said valve member from said first position to said second position while each of said mold sections is in first poistion, whereby, when said sections are disposed with said opposing surfaces in contiguous relation molten plastic material flows into said cavity and is followed by a blast of compressed air as said valve member moves from said first to said second position, said compressed air forcing the core of molten plastic material in said cavity through said outlet opening to form a hollow plastic product, and means associated with said valve casing for circulating molten plastic continuously through said passage means when said valve member is in both its first and its second positions.

2. An apparatus for molding hollow products of a plastic capable of melting upon heating and of passing into a hardened state upon cooling comprising a frame providing a horizontal platform, a pair of mold sections movably mounted upon said platform for horizontal movement in opposite directions toward and away from each other, said sections having opposing vertical surfaces provided with complementary recesses defining a cavity when said sections are in contiguous relation and having inlet and outlet openings communicating with said cavity, means for cyclically moving each of said mold sections between a first position wherein said opposing surfaces are in contiguous relation and a second position wherein said surfaces are spaced apart, a valve casing disposed below said platform, said casing and said platform being provided with a flow passage communicating with the inlet opening of said mold cavity when said sections are in first position, a source of molten plastic material, a source of compressed air, passage providing means for conducting compressed air and a continuous stream of molten plastic from said sources to said valve casing, a valve member movable within said casing between a first position wherein said source of molten plastic communicates with said flow passage and a second position wherein said source of compressed air communicates with said passage and wherein said passage-providing means returns molten plastic to its source, means for moving said valve member from said first position to said second position while said mold sections are in contiguous relation and pumping means associated with said passage providing means for continuously circulating molten plastic through said apparatus.

3. The structure of claim 2 in which means are provided for pushing plastic products formed by said mold sections out of the path of the same while said sections are spaced from each other.

4. In an apparatus having a pair of complementary mold sections for molding hollow products of a plastic capable of melting upon heating and of passing into a hardened state upon cooling, a valve assembly for controlling the flow of molten plastic and compressed air to said mold sections, said valve assembly comprising a valve casing having a bore therethrough and a valve member movable within said bore between a first and a second position, said casing providing a flow passage extending from said bore towards said mold sections, said valve member having a passage therethrough aligned with the flow passage of said casing for delivering compressed air to said mold sections only when said valve member is in said second position, said casing also providing an inlet opening for the flow of molten plastic into said bore and a return opening for the flow of plastic out of said bore and back to its source, said inlet opening communicating with said casing passage only when said movable valve member is in said first position, said valve member blocking communication between said flow passage and said valve passage when said member is in its first position and blocking communication between said flow passage and said inlet opening when said valve member is in its second position, said inlet and return openings communicating through said bore for the return of molten plastic when said valve member is in its second position, means for sequentially moving said valve member between said first and said second positions, and pumping means associated with said inlet and return openings and with said flow passage for continuously circulating molten plastic through said apparatus when said valve member is in both its first and its second positions.

5. The structure of claim 4 in which said means comprises an air-operated piston, said piston being connected to said movable valve member for moving said member between first and second positions.

6. In an apparatus having a pair of complementary mold sections for molding hollow products of a plastic capable of melting upon heating and of passing into a hardened state upon cooling, a valve assembly for controlling the flow of molten plastic and compressed air to said mold sections, said valve assembly comprising a valve casing having a bore extending therethrough and a valve member movable within said bore between a first and a second position, said casing having a flow passage communicating with said bore and being adapted to communicate with a cavity defined by said mold sections, said valve member having end portions and an intermediate portion of reduced transverse dimensions providing an annular space within said bore between said end portions, one of said end portions providing an air passage therethrough adapted for alignment with said flow passage of said casing when said member is in said second position, said casing having an inlet opening for the flow of molten plastic material into the annular space surrounding the intermediate portion of said valve member, said flow passage of said casing communicating with said annular space only when said valve member is in said first position, said casing also having a plastic-return opening communicating with said annular space only when said valve member is in said second position, whereby, when said valve member is in said first position molten plastic material may be forced through said inlet opening and into said flow passage of said casing and when said valve member is in said second position said molten plastic may return to its source through said return opening and compressed air may flow through said member and into said flow passage, and means associated with said valve assembly for circulating molten plastic continuously through said apparatus when said valve member is in both its first and its second positions.

7. The structure of claim 6 in which said casing is provided with a chamber therein, said casing also providing an inlet and outlet to said chamber for the circulation of a heat-containing fluid therethrough.

8. The structure of claim 6 in which piston means are provided for sequentially moving said valve member between said first and said second position within said bore.

References Cited in the file of this patent

UNITED STATES PATENTS

| | | |
|---|---|---|
| 1,820,653 | Ernst | Aug. 25, 1931 |
| 2,782,801 | Ludwig | Feb. 26, 1957 |
| 2,885,733 | Chupa | May 12, 1959 |
| 2,991,506 | Crandall | July 11, 1961 |

FOREIGN PATENTS

| | | |
|---|---|---|
| 722,189 | France | Dec. 28, 1931 |
| 697,326 | Great Britain | Sept. 23, 1953 |
| 405,386 | Italy | Mar. 26, 1941 |